United States Patent Office 3,661,882
Patented May 9, 1972

3,661,882
POLYMERIZATION CATALYST DERIVED FROM ZERO-VALENT STATE METAL COORDINATION COMPLEX WITH GROUP V–A COMPOUND ETC.
John J. Hawkins, Santa Ana, Calif., Charles D. Storrs, Niagara Falls, N.Y., and Stanley D. Zimmerman, Morrisville, Pa., assignors to Columbian Carbon Company
No Drawing. Filed Sept. 5, 1969, Ser. No. 855,753
Int. Cl. C08d 1/14, 3/06
U.S. Cl. 260—94.3                                    23 Claims

ABSTRACT OF THE DISCLOSURE

A catalyst composition is provided which contains a coordination complex of a Group V–A compound such as triphenyl phosphite and a group zero-valent state metal such as nickel, for example, tetrakis(triphenylphosphite) nickel (O) or bis(triphenylphosphite) nickel (O) dicarbonyl, together with an inorganic Lewis acid such as aluminum chloride, boron trifluoride, or zinc chloride, suitably with a solvent such as tetrahydrofuran, cyclohexane, or methyl chloride, which catalyst is used to polymerize an unsaturated monomer such as butadiene.

---

This invention relates to a novel catalyst system and to a novel method of polymerizing olefinic compounds therewith to obtain linear polymers. More particularly, the catalyst is a combination of (i) certain group metal complexes in which the metal exists in the zero-valent state, preferably nickel or cobalt, with (ii) inorganic Lewis acids, and it is utilized for the polymerization of unsaturated organic compounds, particularly those having non-aromatic conjugated unsaturation.

There are a number of ways in which open chain unsaturated compounds having conjugated unsaturation may be joined to other unsaturated molecules by polymerization. It is well established in the art that many of the physical properties of a polymer are directly related to the microstructure of the macromolecules of the polymer. The principal stereoisomers which occur in polymers of 1,3-butadiene and related compounds are as follows:

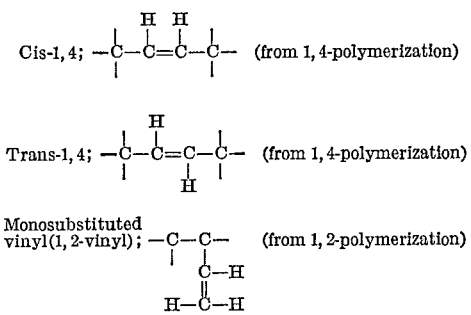

Hereinafter, these isomeric unsaturation types are called cis, trans, and vinyl, respectively. In addition to the microstructure of a polymer the average length of the polymer chains in a unit weight of the polymer contribute in a major way to the properties of the polymer. Polybutadiene may be considered to be homostructural or a homo polymer if its stereoisomeric structure consists of one of the three main structural types noted above. There are several ways in which butadiene molecules may link in polymerization to produce linear macromolecules of perfect order. In polymerization by 1,4-addition, the internal double bonds of a polymer chain may all have the cis-unsaturation or trans-unsaturation configuration. If the polymerization takes place by 1,2-addition with the butadiene units linked head-to-tail, two different types of orderly structures are possible depending on whether the vinyl branches line up all on one side of the chain, or whether they alternate regularly on opposite sides of the chain to form either "isotactic" or "syndiotactic" structures respectively. Because of the regularity of the chains, polybutadienes approaching 100% of any one of these structures will be crystallizable polymers. If, however, the elements of two or more of the structures are combined randomly along the polymer chain, amorphous polymers of entirely different properties result. Thus, a third less important type of 1,2-addition is possible, called "atactical," which consists of random distribution of the alternating and on-one-side types. The importance of and benefits to be derived from such random structure in connection with 1,4-addition has been described by Berger and Buckley, in Chemical and Engineering News, pages 42–44, Aug. 6, 1962.

In one embodiment, the process of the present invention is believed to directly achieve a truly random distribution of trans and cis strurctures during polymerization. In another embodiment, highly linear polymers are prepared which have a predominant proportion of trans-1,4-unsaturation. And thirdly, the microstructure orientation may be varied over a wide range of trans-vinyl-cis distributions. Thus, the polymers produced according to the invention may be an essentially vinyl-free trans-cis polymer having a mole ratio of these two unsaturation types of between about 80:20 and 60:40, for instance 75:25. Polymers having ratios of trans-vinyl-cis distribution of between about 50:45:4 and 90:1:9 are obtained accordingly to another embodiment of the invention. Cis-free polymers are obtained having a trans-vinyl ratio of between about 80:20 and 100:0. In general, the polymers have 50 to 100% trans unsaturation, 0 to 45% vinyl unsaturation, and 0 to 40% cis unsaturation. The polymers which are essentially free of cis-unsaturation may range from liquids to soft, waxy solids and to hard glossy thermoplastic materials. Polymers containing cis-unsaturation may also be liquid, and in the intermediate or higher molecular weight range, are tacky or rubbery solids. As may be seen the proportion of vinyl unsaturation is kept at a minimum, since it confers certain undesirable properties upon the polymers. The control of the unsaturation distribution will be discussed more fully hereinafter. Whenever ratios of unsaturation types are described, molar ratios are intended.

The highly linear polymers of the invention are highly unsaturated, and can be cross-linked by known methods to prepare solid polymers. Other uses include the addition of the waxy products to wax emulsions, the addition of the materials to synthetic and natural elastomers, the preparation of curable coatings, and other uses well known to those skilled in the art.

The quantities of several types of unsaturation as described herein are determined from infrared spectra at wave lengths of 10.98±0.2 microns for monosubstituted vinyl unsaturation, 10.34±9.2 microns for trans unsaturation and about 14 microns for cis unsaturation.

Absorptivities for these determinations were:

|  | Liters/mole-cm. |
|---|---|
| Cis | 92 |
| Trans | 118 |
| Monosubstituted vinyl | 149 |

The infrared spectometer used was a Baird, Model 4–55.

Amounts of such unsaturation types as determined by infrared spectroscopy in the polymer according to this invention are in the following approximate ranges:

|  | Mole/100 g. |
|---|---|
| Cis | 0–.40 |
| Trans | .50–1.00 |
| Monosubstituted vinyl | 0–.45 |

Total chemical determined unsaturation (representative polymers were titrated with iodine mono-bromide) ranges from about 1.5 to about 1.75 moles/100 g. of polymer.

Intrinsic viscosity, a measure of molecular weight, ranges from about 0.01 dl./g. to 1.5 dl./g. in the following examples, although the invention encompasses the preparation of polymers having other viscosities.

The process of the invention comprises introducing the unsaturated monomer or monomers into an enclosed reaction zone with about .01% to 3%, based on monomer weight, of the catalyst combination, with a solvent where necessary, and heating the mixture to a temperature of between about 30° C. and 200° C., preferably 70° C. to 130° C., for a period of from about .25 hour to about 30 hours at the autogenous pressure of the reaction system, e.g., 50 to 500 p.s.i.g. Lower temperatures, such as 0° C. are sometimes useful. The linear polymer is then recovered.

The ratio of the inorganic Lewis acid component to the nickel or other group VIII metal complex, on a molar basis is between about 100:1 and .1:1, A preferred ratio is between 10:1 and 1:1.

The nickel complexes utilized as one component of the catalyst composition are well known materials, having found utility in the prior art as catalysts in processes of preparing cycloolefins from diolefinic compounds such as butadiene, for example. The empirical formula for the nickel compounds is as follows:

$$[(RQ_a)_3Z]_xNi(CO)_{4-x}$$

wherein R is an organic radical; Q is sulfur or oxygen; $a$ is zero or 1; Z is a Group V–A element, that is, N, P, As, Sb, or Bi; and $x$ is a whole number from 1 to 4. Two or more of the radicals R may be combined in a single radical. In place of nickel, zero-valent Pd, Pt, Co, Fe, Cr, Ru, Rh, Os, and Ir are useful in the above and similar formulas according to the invention. The ferrous metals, Ni, Fe, and Co, are preferred. Of course, the coordination valence of the central zero-valent metal atom determines the total number of ligands complexed therewith.

A broader formula for these metal complexes is $$(L)_xM(CO)_{v-x}$$

in which L is a compound of a trivalent group V–A element, preferably phosphorous, arsenic, or antimony, for example the compound $(RQ_a)_3Z$ of the formula given above, M is a group VIII metal in the zero-valent state bonded to the ligand L and to the carbon monoxide only by coordination bonds, in which $x$ equals at least 1 and may be as large as $v$, and in which $v$ corresponds to the number of coordination bonds of the metal M.

Different radicals R may be associated directly or through oxygen or sulfur with any one Z, and where $x$ is more than one, a plurality of the compounds of one or more of the elements nitrogen, phosphorous, arsenic, antimony, or bismuth may be associated with a single nickel atom. Phosphorous is preferred. The nickel (or other group VIII metal) is zero-valent or Ni(O); that is, the catalyst is a complex in which the associated molecules are bonded to the metal only by coordination bonds.

The radicals R are suitably organic radicals, preferably consisting of hydrogen and carbon, the hydrocarbon radicals. The radicals R, however, may be substituted hydrocarbons, for example the substitutents being made up of hydrogen and carbon, halogen, nitrogen, sulphur, and/or oxygen. Also, one or more of the radicals R may be a heterocyclic radical. Examples of open-chain alkyl radicals, preferably having less than about 20 carbon atoms, as a radical R, are methyl, ethyl, propyl, butyl, and homologous radicals such as hexyl, dodecyl, isooctyl, isobutyl, and isopentyl. Useful cycloalkyl hydrocarbon radicals include cyclopentyl, cyclohexyl, cyclooctyl, and similar groups. Representative aryl radicals are phenyl, biphenyl, α-naphthyl, and β-naphthyl.

Suitable halogens are chlorine, fluorine, bromine, and iodine. Examples of halogen substituted radicals are p-chlorophenyl, 2-chloroethyl, m-(trifluoromethyl) phenyl, bromocyclohexyl, 1-iodopropyl, and similar radicals. Representative alkylaryl radicals are m-tolyl, p-tolyl, o-tolyl, and 3,4-xylyl. Arylalkyl radicals according to the invention are represented by the benzyl and benzhydryl radicals. Other useful substituted hydrocarbon radicals include p-methoxyphenyl and p-acetophenyl. Known homologus radicals provide further useful variants. Heterocyclic radicals which are useful include tetrahydrofurfuryl and pyridyl.

For example, various tri-substituted nickel monocarbonyl compounds are useful. Examples of compounds wherein the radicals are the same are tris(tri-phenylphosphite) nickel monocarbonyl, tris(tri-p-tolyl-phosphite) nickel monocarbonyl, tris(triphonylphosphine) nickel monocarbonyl, and similar compounds within the above-defined formula. Instances of catalysts prepared so that the radical R varies within a given catalyst are bis-(triphenyl-phosphine)-tritolylphosphite nickel monocarbonyl, bis(triphenylphosphite)-triethylphosphite nickel monocarbonyl, and tris-(mixed 2-ethyl-hexyl-octyl-phenylphosphite) nickel monocarbonyl. Similar variations may be made where phosphine compounds are utilized, and both phosphine and phosphite compounds may be bonded to the NiO. Examples of such compounds are bis(triphenyl-phosphite)-tripehnylphosphine nickel monocarbonyl, and bis(triphenylphosphine) triphenylphosphite nickel monocarbonyl. Comparable compounds for example derived from Ni(CO)$_4$ but with arsines, arsenites, stibines, and/or antimonites substituted for the phosphines and phosphites are useful. The specified trisubstituted nickel monocarbonyl compounds are, in general, suitably replaced by the disubstituted nickel dicarbonyl, mono-substituted nickel tricarbonyl, or tetra-substituted nickel compounds having comparable radicals R in the above formula.

Other nickel complexes and similar complexes useful according to the invention include tris(triphenylphosphite)-triphenylphosphine nickel,
tetrakis(tri-p-methoxyphenylphosphite) nickel,
tetrakis(tri-p-tolyl phosphite) nickel,
bis(triphenylphosphite) bis(triethylphosphite) nickel,
tetrakis[tri(2-ethylhexyl) phosphite]nickel,
bis(trisooctyl phosphite) nickel dicarbonyl,
bis(triphenyl arsine) nickel dicarbonyl,
bis(triphenylphosphine) nickel dicarbonyl,
triphenylphosphite nickel tricarbonyl,
bis(triphenylthiophosphite) nickel dicarbonyl,
bis(triphenylantimonite) nickel dicarbonyl,
bis(triphenylarsenite) nickel dicarbonyl,
bis(triphenyl stibine) nickel dicarbonyl,
bis(phenyldiethylphosphine) nickel dicarbonyl,
tetrakis(tridecylphosphite) nickel,
tetrakis(triphenylphosphine)nickel,
tetrakis(tricyclohexylphosphite) nickel,
bis(orthophenylenebisdimethylarsine) nickel,
bis[orthophenylenebis(dimethylstibine)] nickel,
bis(tri-p-chlorophenylphosphite)nickel dicarbonyl,
tetrakis(trichlorophosphine)nickel,
bis(triphenylphosphite) platinum dicarbonyl,
tetrakis(triphenylphosphine) platinum,
tris(triphenylphosphine) platinum monocarbonyl,
tetrakis(triphenylphosphite) palladium,
di(triphenylphosphite) cobalt tricarbonyl,
triphenylphospite iron tetracarbonyl,
triphonylphosphine iron tetracarbonyl,
bis(triphenylphosphite) iron tricarbonyl,
bis(triphenylphosphite) chromium tetracarbonyl, and others.

Disclosure of similar metal(O)-ligand complexes useful according to the invention appear in U.S. Patents 2,964,575; 2,972,640; 3,004,081; 3,102,899; in French Patents 1,290,660 and 1,297,934; as well as in the publication by Malatesta and Sacco, Ann. Chim. (Rome), 1954, volume 44, pp. 134–138 and by Reed, J. Chem. Soc., pp. 1931–41 (1954). Preferred ligands are triorganophosphines, triorganophosphites, triorganoarsines, triorganostibines, triorganoantimonites, and triorganoarsenites, whether or not carbon monoxide is present in the complex.

The inorganic acid component of the catalyst is an electron-pair acceptor. These acids are described by Vander Werf in the text entitled "Acids, Bases, and the Chemistry of the Covalent Bond," pp. 60–71, 1961, Reinhold Publishing Corp., New York. A preferred group of Lewis acids includes chemical compounds whose central atom has an incomplete octet of electrons and those compounds in which the octet of the central atom can be expanded. A particularly preferred group of Lewis acids are the Friedel-Crafts catalysts.

Examples of preferred Lewis acids useful as cocatalysts according to the present invention include $AlBr_3$, $AlCl_3$, $Al_2Cl_6$, $AlF_3$, $AlI_3$, $Al(OH)(Cl_2)$, $Al(OH)_2(Cl)$, $$Al_2(SO_4)_3$$

$AsBr_3$, $AsCl_3$, $AsBr_5$, $AsI_3$, $AsI_5$, $SbH_3$, $SbCl_3$, $SbCl_5$, $BeCl_2$, $BiCl_3$, $BF_3$, $CdBr_2$, $CdCl_2$, $CdI_2$, $CdF_2$, $CrCl_3$, $FeBr_3$, $FeCl_3$, $HF$, $MgBr_2$, $NbCl_5$, $NiCl_2$, $PBr_3$, $PCl_3$, $PCl_5$, $PF_3$, $PF_5$, $PH_3$, $POCl_3$, $POF_2$, $P_2O_5$, $H_2SO_4$, $SnCl_2$, $SnCl_4$, $TaCl_5$, $TeCl_2$, $TeCl_4$, $TiCl_4$, $TiI_4$, $ZnO$, $ZnBr_2$, $ZnCl_2$, $ZnI_2$, $Zn(NO_3)_2$, $ZrBr_2$ and $ZrCl_4$, Whenever the language "Friedel-Crafts" catalysts appears in this application the meaning intended is to designate those Lewis acids which are acid acting metal halides and oxyhalides (and "metals" as used herein includes boron), and complexes thereof, HF, $H_2SO_4$, phosphorous oxides, phosphorous halides, phosphorous oxyhalides, and phosphoric acids. The limitation that the Lewis acids are inorganic is intended to exclude compounds such as hydrocarbonyl metal halides.

For the provision of a wide variety of methods of purifying the polymer combined with excellent catalytic activity, the more desirable Friedel-Crafts catalysts are halides of low-melting, heavy metals having an atomic weight of less than 122, and particularly halides of these common metals have an atomic weight of less than 66 and which form amphoteric metal oxides, i.e., aluminum and zinc. For the purposes of this application the periodic groups of the elements and their properties are as described in Lange's Handbook of Chemistry, Seventh Ed., 1949, at pages 58 and 59, with the exception that for the purposes of this application boron is classified as a metal.

Other well known Friedel-Crafts catalysts are useful. Thus boron trifluoride complexed with diethyl ether, "ansolvo" acids, which are coordinated complexes of Lewis acids which are acid acting metal halides with Lewis bases which are oxygen-containing organic compounds such as alcohols, ethers, ketones, phenols, aldehydes, etc., as disclosed in U.S. Pat. Nos. 2,780,664; 2,777,890; and 2,762,712. Similarly, Friedel-Crafts catalysts such as those taught by U.S. Pat. Nos. 2,379,656 and 2,513,558, including complex catalysts such as the coordination complexes of boron trifluoride with water, alcohols, ethers, glycols, ketones, phenols, esters, and other materials are useful. As suggested above, complexes are also obtained with water in place of the ether or similar compound, and a combination of, for example, boron trifluoride-etherate within the neighborhood of one mole of water per mole of complex are also useful.

Double salts such as $AlCl_3 \cdot NaCl$ and mixtures of Friedel-Crafts catalysts such as equimolar parts of $AlCl_3$ and $FeCl_3$ are also useful.

Common solvents for Friedel-Crafts catalysts are of benefit. These include ethyl ether, chloroform, carbon tetrachloride, ethanol, carbon disulfide, haloalkanes such as ethyl chloride, methyl chloride, methylene dichloride, and others. Of course, the solvent is selected on the basis of known properties of the Friedel-Crafts catalyst. Thus, methanol is not used for the Friedel-Crafts component if it is such that it decomposes in the presence of such a solvent.

It has been found that tetrahydrofuran (THF) in small amounts not only serves as a solvent for certain Lewis acid or Friedel-Crafts catalysts and/or for the group VIII metal complex, but greatly enhances the rate of the reaction. The proportion of the tetrahydrofuran is somewhat critical, and based on the weight of the Lewis acid or Friedel-Crafts catalysts should be present in a weight ratio of catalyst to THF solvent of between about 1:10 and 2:1. Less desirably, ratios outside of these ranges are useful.

Other common diluents or solvents utilized in Friedel-Crafts reactions are useful in this connection. Thus, saturated hydrocarbons, both alkanes and cycloalkanes, and having from about 3 to about 10 carbon atoms, are useful. Butane, isopentane, heptane, ethylcyclohexane, cyclohexane, and other solvents or diluents are useful. In some cases a plurality of solvents are desirable, one solvent being introduced to maintain the Friedel-Crafts catalyst in solution, and another solvent being introduced for the other catalyst component, the unsaturated monomer and the resulting polymer. The catalysts need not be dissolved or in a homogeneous reaction mixture, but may be present in solid form, that is, in a heterogeneous reaction mixture. The solubilities of Friedel-Crafts catalysts in various solvents are set forth in "Handbook of Chemistry," Lange, 7th edition, 1949, pages 177–297.

It is known that complexes such as tris(triphenylphosphite) nickel monocarbonyl are soluble in solvents such as hexane, heptane, octane, cyclopentane, ethylcyclopentane, dimethylcyclopentane, cyclohexane, dimethylcyclohexane, methylethylcyclohexane, benzene, and toluene. The carbon monoxide-free nickel complexes such as tetrakis(triphenylphosphite) nickel are commonly utilized with aromatic solvents such as benzene.

The solvent to monomer ratio, on a weight basis, is preferably below 4:1, for example between about 0.1:1 and 4:1. A lower proportion of solvent, between about 0.5 and 1 part per part of monomer, has been found to increase the molecular weight of the polymer.

Preferably the solvent is one which gives a homogeneous reaction mixture, although a heterogeneous system is useful. The latter gives a broader distribution of molecular weights in a given polymer.

In addition to 1,3-butadiene, other substituted and unsubstituted organic compounds having conjugated non-aromatic unsaturation are useful for the preparation of polymers. These include isoprene, chloroprene, 1,3-pentadiene, 2,3-dichloro-1,3-butadiene, 2,3-dimethyl-1,3-butadiene, 1-chloro-1,3-butadiene, 1-chloro-3-bromo-1,3-butadiene, 3-methyl-1,3-hexadiene, 2,3-diethyl-1,3-hexadiene, and 1,3-heptadiene. Substituted and unsubstituted open chain compounds having conjugated unsaturation and having 4 to 6 carbon atoms in the molecule are the preferred monomers. Other unsaturated compounds which may be polymerized utilizing the catalyst of the invention are ethylene, propylene, isobutylene, vinyl chloride and other α-monoolefinic compounds having 2 to 12 carbon atoms. These include styrene, vinyltoluene, and similar vinyl compounds having a benzene ring as a nucleus. In general, any polymerizable unsaturated organic compound (i.e., having one or more carbon-to-carbon double bonds) is useful.

With diolefinic compounds, it is sometimes desirable (as in a heterogeneous system) to use comonomers or other compounds which act as chain terminators, such as styrene, butene-1, isobutylene, isoprene, 1,3-cyclooctadiene, ethyl vinyl ether and thiophenol. For example, styrene, in the amount of 1–15% based upon the weight of 1,3-butadiene, is useful.

In general, at least 50%, preferably 85–100% of the monomers charged to the reactor is one or more of the unsaturated compounds having non-aromatic conjugated unsaturation, with less than 50%, preferably 0–15% of the monomers charged being monoolefinic.

Mixtures of monomers such as a mixture of equal parts by weight of isoprene and 1,3-butadiene, are within the scope of the invention. Other comonomers include vinylcyclohexene, 1,3-cyclooctadiene, and other unsaturated hydrocarbons and substituted unsaturated hydrocarbons such as those mentioned above, particularly with 1,3-butadiene.

The monomers useful according to the invention are those produced by conventional processes. For instance, the butadiene is suitably prepared in a commercial plant by the dehydrogenation of butene, followed by purification with cuprous ammonium acetate. A crystalline complex of the cuprous ammonium acetate with butadiene is formed, and the butadiene is released from the complex by the application of heat. As has been known since 1950 or earlier, from commercial butadiene plant operation in this country, this process gives "plant" butadiene of about 95 to 99% purity with little variation for a given set of conditions.

The butadiene may be passed through a column of gel to remove excessive amounts of water and presently a substantial proportion of the polymerization inhibitors such as paratertiary butylcatechol. The butadiene was obtained from the plant of Petroleum Chemicals Incorporated, Lake Charles, La. An analysis of "plant" butadiene is as follows:

diluent, and the two liquid phases are separated. Another procedure for purifying the polymer includes treating the same with anhydrous ethanol and ammonia in stoichiometric excess, for example to yield aluminum in stoichiometric and ammonium chloride from aluminum chloride which are then separated from the polymer.

Other recovery methods include precipitating the polymer for solution in the reaction product by the addition of methanol followed by evaporating the methanol and residual solvent, using a vacuum and a low temperature. Simply evaporating the solvent provides a stable product particularly when the product is a waxy material having a high proportion of trans-1,4-polybutadiene, optionally with a small portion of vinyl unsaturation, and being essentially free of cis-unsaturation. A preferred method is to simply evaporate a portion of the solvent from the reaction mixture and to transport or store the polymer as a concentrated solution. With this method, the solvent may be removed shortly before utilizing the polymer in its intended utility, additional purification being performed at that time if desired. The last-mentioned method of recovery, evaporating only part of the solvent, avoids gel formation and deterioration during storage.

Antioxidants or polymerization inhibitors are suitably added to the polymer after or prior to recovery thereof. One such antioxidant is butylated hydroxyanisole (tertiary-butyl-p-cresol). Another suitable inhibitor for the raw polymer and 0–40% cis unsaturation, although the invention is not limited to these proportions.

EXAMPLE 1

Zinc chloride (12 g.) dissolved in tetrahydrofuran (THF) (50 g.) was drawn into a one gallon autoclave by the use of a reduced pressure within the autoclave. Tetrakis(triphenylphosphite) nickel (20 g.) having the formula [$(C_6H_5O)_3P]_4Ni$, was dissolved in 950 grams of benzene and charged in the same way as the zinc chloride-THF solution. Butadiene (1196 g.) was then forced into the reactor under pressure, the reactor was closed and the reaction mixture was heated to 120° C. until completion of the reaction, which took 4 hours. The pressure maintained in the reactor was a maximum of about 250 p.s.i.g. The polymer was recovered by introducing 50 ml. of methyl alcohol into the reaction mixture followed by subjecting the contents to the action of gaseous carbon dioxide under a pressure of 350 p.s.i.g. and stirring was continued for 30 minutes to quench the reaction mixture. During the quench the temperature was 120° C. (70–120° C.). Hexane was added to the reaction mixture in the proportion by volume of 1:1, and the solids were then separated by a centrifugal bowl separator, leaving a clear solution of polybutadiene in the benzene-hexane solvent. The solvent was removed by vacuum using a rotary film evaporator, leaving a wax-like solid, which was determined to have an unsaturation of 1.74 moles per 100 g. by means of chemical titration and a ratio of trans-1,4-unsaturation to monosubstituted vinyl unsaturation of 13:1. A portion of the product was dissolved in p-xylene to give a solids content of 97.5% by weight of non-volatile materials. The polymer was evaluated as to viscosity and found to have a Ford cup of 31 at 24.5° C.

EXAMPLE 2

Similar procedures to Example 1 were used in a one-gallon autoclave. The zinc chloride was dried and dissolved in a minimum amount of tetrahydrofuran, followed by a benzene solution of the other catalyst component then followed by the introduction of butadiene. (As is conventional, "butadiene" as used in this application means 1,3-butadiene.) Following are the conditions and results. A total of 950 g. of benzene was used with 15.3 millimoles of nickel as tetrakis(triphenylphosphite) nickel and with 88 millimoles of zinc as zinc chloride. The butadiene introduced amounted to 1200 g., and the reaction was conducted for a period of 7 hours at a temperature of 120° C., the pressure being 245 p.s.i.g. at its maximum. Evaluation of the unsaturation of the polymer as determined by infrared spectrometry showed 1.65 moles of unsaturation per 100 g. of polymer. The infrared spectra showed no cis-1,4-unsaturation, and the ratio of trans-1,4-unsaturation to monosubstituted vinyl unsaturation was 13:1. The phenol content of the polymer was 0.56%.

EXAMPLE 3

Using a procedure identical to that of Example 2, but using 15.3 millimoles of nickel as tris(triphenylphosphite) nickel monocarbonyl, formula [$(C_6H_5O)_3P]_3NiCO$ together with 66 millimoles of zinc as zinc chloride and conducting the reaction for 5 hours, gave an infrared unsaturation of 1.74 moles per 100 g. of polymer with a trans to vinyl ratio of 16:1. The phenol content of this polymer was 0.077%.

Purification of the products of Examples 2 and 3 was performed by the addition of petroleum naphtha amounting to one-half of the volume of the benzene solution of polymer, and the product centrifuged in a centrifugal bowl separator.

The benzene and naphtha were vacuum stripped from the polymer leaving a white solid melting in the range of 65–70° C. The polybutadiene was quite crystalline and had the appearance and texture of wax.

EXAMPLE 4

Using a similar procedure in a 300 ml. stirred autoclave, 1.2 g. tetrakis(triphenylphosphite) nickel, 1.2 g. of zinc chloride, 25 g. of benzene, 4 g. of tetrahydrofuran, 25 g. of 1,3-cyclooctadiene, and 72 g. of butadiene were reacted at a temperature of 120° C. for 1 hour. The polymer solution was diluted with petroleum naphtha and removed from the autoclave. Ethyl alcohol or acetone was added to portions of the polymer solution which caused a white solid polymer to precipitate. Upon the separation of the polymer and liquid, and removal of the residual solvent, a polymer was obtained which melted in the range of 70–75° C. The solid polymer was soluble in petroleum naphtha or cyclohexane. Infrared analysis of the polymer indicated it to be a homopolymer of butadiene having an infrared unsaturation of 1.51 moles per 100 g. of polymer with no cis-1,4-unsaturation. The ratio of trans-1,4-unsaturation to monosubstituted vinyl unsaturation was 13.6:1.

EXAMPLE 5

One gram of tris(triphenylphosphite) nickel monocarbonyl, 0.5 gram of $ZnCl_2$, 30 grams of benzene and 100 grams of butadiene were charged to a 300 ml. stirred autoclave, and a reaction temperature of 120° C. was maintained for 4 hours. The catalyst was then quenched with carbon dioxide. Infrared analysis of the recovered polymer showed no carboxyl groups, but the carbon dioxide treatment increased the ease of purifying the polymer. The polymer contained 1.69 moles of unsaturation per 100 grams, no detectable cis-1,4-unsaturation, and a ratio of trans/vinyl unsaturation of 14:1. A similar experiment gave a comparable polymer, but which differed in having 1.48 moles of unsaturation per 100 g., and a trans/vinyl ratio of 12.4:1.

EXAMPLES 6–32

Following a procedure similar to the foregoing examples and using, in each case, 15 grams of tris(triphenylphosphite) nickel monocarbonyl (TTPNC), and under the following conditions, resulted in the recovery of polymers as described in the following table.

| Example | Co-catalyst | Solvent | Butadiene (g.) | Temp. (° C.) | Time (hr.) | Unsaturation, trans:vinyl:cis | Polymer (g.) | Intrinsic viscosity at 100 C. and nature of polymer |
|---|---|---|---|---|---|---|---|---|
| 6 | $SnCl_2$ (10 g.) | Benzene (950 g.) | 1,200 | 120 | 39 | 10.5:1:0 | 120 | 0.41 dl./g., waxy solid. |
| 7 | $TiI_4$ (5.5 g.) | Benzene (900 g.) | 1,192 | 120 | 40 | 9.9:1:0 | 273 | .115 dl./g., waxy solid. |
| 8 | $CdI_2$ (7 g.) | Hexane (700 g.) | 1,200 | {120 / 130} | {6 / 15} | 3.8:1:0 | 140 | Liquid. |
| 9 | $CdI_2$ (7 g.) | Benzene (900 g.) | 1,304 | 120 | 2.5 | 8.4:1:0 | 140 | Dark liquid. |
| 10 | $MgBr_2$ (9 g.) | Hexane (700 g.) | 1,200 | 120 | 18 | 6.3:1:0 | 780 | Clear liquid. |
| 11 | $ZnCl_2$ (9 g.) | Benzene (900 g.), THF (10 g.) | 1,000 | 120 | 3 | 18:1:0 | 850 | .170 dl./g., waxy solid. |
| 12 | $CdI_2$ (9 g.) | Hexane (700 g.) | 1,180 | 120 | 2 | 7:1:0 | 85 | Dark liquid. |
| 13 | $CdI_2$ (9 g.) | Benzene (900 g.), THF (10 g.) | 1,218 | 120 | 15 | 13:1:0 | 555 | .04 dl./g., waxy solid. |
| 14 | $CdCl_2$ (12 g.) | Benzene (900 g.) | 1,000 | 120 | 24 | 4.4:1:0 | 210 | .137 dl./g. |
| 15 | $ZnCl_2$ complex with— $HOC_{17}H_{34}C=O$ \| $N(CH_3)_2$ (15 g.) | do | 1,200 | 120 | 35 | 12.1:1:0 | | .169 dl./g. |
| 16 | do | do | 1,200 | 120 | 26 | | 210 | .472 dl./g. |
| 17 | $ZnCl_2$ complex with— $HOC_{17}H_{34}C=O$ \| $N(CH_3)_2$ (20 g.) | do | 1,200 | 120 | 18 | 13,15:1:0 | 800 | .165 dl./g. |

| Example | Co-catalyst | Solvent | Butadiene (g.) | Temp. (°C.) | Time (hr.) | Unsaturation, trans:vinyl:cis | Polymer (g.) | Intrinsic viscosity at 100°C. and nature of polymer |
|---|---|---|---|---|---|---|---|---|
| 18 | ZnCl₂ (9 g.) | Benzene (885 g.) | 1,075 | 120 | 3.3 | 17.6:1:0 | 935 | .275 dl./g. |
| 19 | ZnCl₂ complex with— HOC₁₇H₃₄C=O \| N(CH₃)₂ (15 g.) | Benzene (900 g.) | 1,200 | 120 | 18 | 20.9:1:0 | 360 | .067 dl./g. |
| 20 | ZnCl₂ (1 g.) TIPNC (1 g.) | Benzene (25 g.), THF (4 g.) | (¹) | 120 / 100 | 2 / 18 | 23.9:1:0 | 65 | .267 dl./g. |
| 21 | ZnCl₂ (9 g.) | Benzene (900 g.), THF (10 g.) | 1,000 | 120 | 1 |  |  | Tacky solid. |
| 22² | FeCl₃ (5 g.) | Benzene (900 g.) | 1,000 | 120 | 60 |  | 420 | Waxy solid. |
| 23 | NiCl₂ (6 g.) | do | 1,000 | 120 | 19 |  | 175 | Liquid. |
| 24 | CdCl₂ (12 g.) | do | 1,000 | 120 | 40 |  | 210 | Do. |
| 25 | SnCl₄ (9 g.) | do | 1,000 | 120 | 60 |  | 170 | Do. |

¹ Butadiene 73 grams, COD=1,3 25 grams.
² Total of 30 grams tris(triphenylphosphite nickel)monocarbonyl added in Example 22.

| Ex. | Co-catalyst | Solvent | Butadiene (g.) | Temp. (°C.) | Time (hr.) | Unsaturation, trans:vinyl:cis | Polymer (g.) | Intrinsic viscosity at 100° C. and nature of polymer |
|---|---|---|---|---|---|---|---|---|
| 26 | BF₃.diethyl ether complex (1.2 ml.) | Benzene (920 g.) | 1,449 | 95 | 1.5 | 9:1:1 |  | .397 dl./g. In 50% sloution of benzene, pale yellow, clear viscose liquid. Contains 6.1 p.p.m. Ni and 3.5 p.p.m. B. Unsaturation was 0.844 moles/100 g. |
| 27 | BF₃.diethyl ether complex (0.6 ml.) | Benzene (360 g.) | 716 | 95 | 1.3 | 8.5:1:.5 | 500 | .477 dl./g. Unsaturation 1.8 moles/100 g. |
| 28 | BF₃.diethyl ether complex. | Hexane (360 g.) | 727 | 75–110 | 4.0 | 11.4:1:2 | 340 | .533 dl./g. Unsaturation 1.8 moles/100 g. |
| 29 | BF₃.diethyl ether complex (3.0 g.) | Tlouene (360 g.) | 731 | 96 | 20.0 | 21.5:1:2:5 | 330 | .912 dl./g. |
| 30 | do | Cyclohexane (360 g.) | 719 | 80–90 | 20.5 | 7:1:2 | 133 | 1.312 dl./g. Unsaturation 1.7 moles/100 g. |
| 31 | do | Chlorobenzene (600 g.) | 720 | 100–121 | 7.0 | 3.5:1:.33 | ca 500 | .154 dl./g. |
| 32 | do | Ethyl cyclohexane | 721 | 95–110 | 3.0 | 15:1:.5 |  | .963 dl./g., tacky. |

EXAMPLES 33–40

The following examples were performed similarly to the foregoing but using the cyclic phosphite of trimethylolethane, that is 1 - methyl-4-phosphina-3,5,8,-trioxybicyclo[2.2.2] octane, as the ligand, the nickel complex having the empirical formula $$[CH_3C(CH_2O)_3P]_2Ni(CO)_2$$

The amount of nickel complex was 0.1% to 1.0% by weight of the 1,3-butadiene, which was the monomer in the examples set forth in the following table.

| Ex. | Co-catalyst | Solvent | Butadiene (g.) | Temp. (°C.) | Time (hr.) | Unsaturation, trans:vinyl:cis | Polymer (g.) | Intrinsic viscosity at 100° C. and nature of polymer |
|---|---|---|---|---|---|---|---|---|
| 33 | ZnCl₂ (1 g.) | Benzene (25 g.), THF (4 g.) | 100 | 120 | <1 | 34.7:1:0 | 70 | 0.734 dl./g. |
| 34 | ZnCl₂ (0.32 g.) | Benzene (100 g.), THF (2 g.) | 32 | 80 / 120 | 1 / 17 | 44.4:1:0 | 25 | 0.372 dl./g. |
| 35 | ZnCl₂ (0.65 g.) | Benzene (30 g.), THF (3 g.) | 65 | 120 | 3 | 45:6:1:0 | 53 | 0.674 dl./g. |
| 36 | BF₃.etherate (0.95 g.) | Benzene (25 g.) | 93 | >200 | .08 | 46:1:0 |  | High molecular weight insoluble polymer; temperature rose spontaneously. |
| 37 | BF₃.etherate (0.05 g.) | Benzene (80 g.) | 53 | 90–120 | .28 | 48:2:0 |  |  |
| 38 | BF₃.etherate (.5 g.) | Benzene (60 g.), THF (10 g.) | 43 | 85 | 3 | 49:1:0 | 40 |  |
| 39 | BF₃.etherate (1.5 g.) | Benzene (900 g.), THF (140 g.) | 684 | 125 | 2.5 / .5 | 49:1:0 | 678 |  |
| 40 | ZnCl₂ (0.75 g.) | Benzene (55 g.), THF (4 g.) | 75 | 80+ | 16 / 1 | 46:1:0 | 25 | .940 dl./g. |

EXAMPLES 41–43

Utilizing the same cyclic phosphite, bis(bicyclic phosphite)nickel dicarbonyl, catalyst as in the immediately foregoing examples, but using other co-catalysts and using a mixture of monomers to obtain an interpolymer, the examples given in the following table were conducted as stated with the results given. The quantity of nickel-containing catalyst in the following examples was 3 grams.

| Ex. | Co-catalyst | Solvent | Monomers | Temp. (°C.) | Time (hr.) | Unsaturation, trans:vinyl:cis | Intrinsic viscosity at 100° C. and nature of polymer |
|---|---|---|---|---|---|---|---|
| 41 | BF₃.diethyl ether complex (3 ml.), (1.5 g.) BF₃ | Benzene (800 g.), THF (60 g.) | Butadiene (627 g.), isoprene (100 g.). | 80–86 |  | 22.3:1:1.3 | Unsaturation, 1.75 moles/100 g. |
| 42 | BF₃.diethyl ether, (4 ml.), (2 g.) BF₃ | Benzene (350 g.), THF (60 g.) with 200 g. additional benzene after 1.75 hrs. of reaction. | Butadiene (601 g.), styrene (100 g.). | 80–89 |  | 24:1:0 | 563 dl./g. tacky powder soluble in heptane and cyclohexane. |
| 43 | do | Benzene (350 g.), THF (60 g.) | Butadiene (695 g.), 4-vinylcyclohexane (40 g.). | 100 | 6 | 25:1:0 | Tacky white powder. Melting point 40° C. Soluble in hexane. |

EXAMPLES 44–47

Using heptane in place of benzene and using BF$_3$-etherate with the bis(cyclic phosphite) nickel dicarbonyl described in connection with Examples 33–40, the catalyst complex precipitates and is quite active. The catalyst is prepared by dissolving the BF$_3$-diethyletherate and the nickel complex in 4 to 5 grams of tetrahydrofuran (THF) per gram of the nickel complex, the Friedel-Crafts agent being added subsequently to the solution of

| Example | Cocatalyst | Solvent | Butadiene (g) | Temp. (°C.) | Time (hr.) | Unsaturation, trans:vinyl:cis | Polymer (g.) | Intrinsic viscosity at 100° C. and nature of polymer |
|---|---|---|---|---|---|---|---|---|
| 44 | BF$_3$.etherate (0.1 g.) | Heptane (50 g.) | 61 | 90–146 | .36 | 48:2:0 | 61 | |
| 45 | do | do | 40 | 90–112 | 1 | 49.5:0.5:0 | 39 | |
| 46 | do | Heptane (50 g.), THF (10 g.) | 43 | 122 | .12 | ¹ 100:0:0 | 31 | |

¹ Trace of vinyl.

| Ex. | Cocatalyst | Solvent | Monomer | Temp. (°C.) | Time (hr.) | Unsaturation, trans:vinyl:cis | Polymer (g.) | Intrinsic viscosity at 100° C. and nature of polymer |
|---|---|---|---|---|---|---|---|---|
| 7 | BF$_3$.etherate (0.05 g.) | Heptane (80 g.), THF (3 g.) | Butadiene (48 g.) | 90 | 1.7 | 49:1:0 | 51 | | the nickel complex. When heptane is added to the mixture the complex catalyst precipitates, thus giving a heterogeneous system. It is believed that during the reaction the surface of the nickel complex is enriched with BF$_3$ while the interior of the solid phase will be deficient in BF$_3$, and that during the reaction at temperatures of above about 80° C. the catalyst dissolves and provides a wide variety of species of catalysts during the polymerization process. Another procedure for preparing a heterogeneous system is to dissolve the nickel phosphite catalyst in THF, then add a lower hydrocarbon such as hexane in which the nickel complex is insoluble, to obtain a slurry, followed by slow addition of BF$_3$ diethyletherate. Since these heterogeneous catalysts are very active, it may be desirable to include a chain terminator to the monomer, 1,3-butadiene in this case. The following illustrate heterogeneous catalysts.

EXAMPLES 48 TO 59

The following reactions were conducted similarly to those described above, the principal change being in the identity of the nickel complex. As in the foregoing examples, the amount of nickel complex was about 1% (or less) based on the weight of the monomer.

| Ex. | Catalyst | Cocatalyst | Solvent | Butadiene | Temp. (°C.) | Time (hr.) | Unsaturation, trans:vinyl:cis. | Polymer (g.) | Intrinsic viscosity at 100° C. and nature of polymer |
|---|---|---|---|---|---|---|---|---|---|
| 48 | [(C$_6$H$_5$)$_3$P]$_3$Ni(CO)$_2$ | BF$_3$ (0.1 g.) | Benzene (60 g.), THF (1 g.) | 40 g. | 110 | 3.5 | 19:1:0 | 30 | |
| 49 | [(C$_6$H$_5$)$_3$P]$_2$Ni(CO)$_2$ | BF$_3$ (0.05 g.) | Hexane (30 g.), THF (12 g.) | 57 g. | 130 | 3.0 | 25:4:1 | 2 | Tacky. |
| 50 | [(C$_6$H$_5$)$_2$As]$_2$Ni(CO)$_2$ | BF$_3$ (0.1 g.) | Benzene (50 g.), THF (5 g.) | 63 g. | 128 | 1 | 24:1:4 | 54 | |
| 51 | [(C$_6$H$_5$)$_3$As]$_2$Ni(CO)$_2$ | BF$_3$ (0.1 g.) | Benzene (50 g.), THF (5 g.) | Butadiene (62 g.), styrene (10 g.) | 90 | 2.0 | 84.4:3.5:12.1 | 31 | Tacky, elastic.¹ |
| 52 | [(C$_6$H$_5$)$_3$AsNi(CO)$_3$ (4 g.) | BF$_3$.etherate (1.6 ml.), (0.9 g.) BF$_3$ | Benzene (700 g.), THF (20 g.) | Butadiene (450 g.), styrene (21 g.) | 80 | 3 | 83:1:16 | 325 | |
| 53 | (C$_6$H$_5$)$_3$AsNi(CO)$_3$ | BF$_3$ (0.1 g.) | Benzene (30 g.), THF (10 g.) | Butadiene (67 g.) | 90–145 | | 92.5:1.5:5.6 | 39 | Do. |
| 54 | [(C$_6$H$_5$)$_3$Sb]$_2$Ni(CO)$_2$ | BF$_3$ (0.05 g.) | Benzene (63 g.), THF (3 ml.) | Butadiene (63 g.), styrene (5 g.) | 120 | 2 | 56.6:8.7:34.7 | 11 | Do. |
| 55 | [(C$_6$H$_5$)$_3$Sb]$_2$Ni(CO)$_2$ | BF$_3$ (0.05 g.) | Benzene (70 g.), THF (3 ml.) | Butadiene (59 g.) | 95 | 2 | 71.8:.7:27.5 | 52 | Do. |

¹ 0.286; al./g. 45% polymer, 55% benzene, water white viscous liquid.

| Ex. | Catalyst | Cocatalyst | Solvent | Monomer | Temp. (°C.) | Time (hr.) | Unsaturation, trans:vinyl:cis | Polymer g. | Intrinsic viscosity at 100° C. and nature of polymer |
|---|---|---|---|---|---|---|---|---|---|
| 56 | (C$_6$H$_5$)$_3$AsNi(CO)$_3$ (0.5 g.) | BF$_3$ etherate (0.2 ml.) | Benzene (40 g.), THF (5 g.) | Butadiene (58 g.), 1,5-cyclo-octadiene (5 g.) | 90 | 1 | 89.7:1.5:8.8 | 64 | Sticky, low molecular weight. |
| 57 | (C$_6$H$_5$)$_3$AsNi(CO)$_3$ (0.5 g.)¹ | BF$_3$ etherate (0.2 ml.), (0.2 g.) dimethyl sulfoxide. | Benzene (51 g.), THF (5 g.) | Butadiene (62 g.), styrene (2.5 g.) | 80–99 | .75 | 85:2.2:12.8 | 68 | Tacky elastic. |
| 58 | (C$_6$H$_5$)$_3$AsNi(CO)$_3$ (4.0 g.) | BF$_3$ etherate (1.6 ml.) | Benzene (700 g.), THF (21 g.) | Butadiene (497 g.), styrene (24 g.) | 80–96 | 1.5 | 89.6:0.1:9.3 | 501 | Do. |
| 59 | [(C$_6$H$_5$)$_3$Sb]$_2$Ni(CO)$_2$ (0.5 g.) | BF$_3$ etherate (0.2 ml.) | Benzene (60 g.) THF (10 g.) | Butadiene (61 g.) | 100 | 2.5 | 89.3/1.6/9.1 | 25 | Do. |

¹ Heterogeneous catalyst mixture.

EXAMPLES 60 AND 61

The diolefinic monomer need not be absolutely pure. Thus naphtha cracked butadiene is useful in the process. A partial analyses of such impure monomer starting materials are as follows:

| Compound | Sample 1 | Sample 2 |
|---|---|---|
| Percent by weight: | | |
| Butylene | 19.6 | 23.7 |
| Isobuytlene | 22.5 | 22.5 |
| Trans-butene-2 | 6.3 | 5.2 |
| Cis-butene-2 | 4.5 | 3.9 |
| 1,3-butadiene | 45.5 | 40.2 |
| Water, p.p.m. | 188 | 20 |

The polymerizations were carried out in a 300 milliliter stirred autoclave utilizing Sample 1. In the following two examples 120 grams of the sample was used in the first example and 110 grams of the sample was used in the second example. The nickel complex was the bis(bicyclicphosphite) nickel dicarbonyl described in preceding examples.

num, bis(triphenylphosphite) iron tricarbonyl, tetrakis(triphenylphosphite) palladium, or similar zero-valent group VIII metal complexes, are used to polymerize butadiene or similar monomers, in benzene at temperatures of 70° C. to 130° C. for two to six hours using .2%

| Example | Co-catalyst | Solvent | Butadiene (g.) | Temp. (°C.) | Time (hr.) | Unsaturation, trans:vinyl:cis | Polymer (g.) | Intrinsic viscosity at 100° C. and nature of polymer |
|---|---|---|---|---|---|---|---|---|
| 60 | ZnCl₂; freshly fused (0.5 g.) | None added (3 g.) THF | 55 | 120 | 4-5 | 45-1-0 | 28 | White waxy solid. |
| 61 | do | Benzene (25 g.), THF (3 g.) | 50 | 120 | 4 | 100:0:0 | 30 | |

EXAMPLE 62

In interpolymer of 1,3-butadiene and 1,3-cyclooctadiene was prepared. One gram of ZnCl₂ was introduced into the reactor with 1 gram of tris(triphenylphosphite) nickel monocarbonyl, 25 grams of benzene, 73 grams of butadiene and 25 grams of 1,3-cyclooctadiene. The reaction temperature was 100–120° C. and the reaction was conducted for 18 hours. The trans:vinyl:cis ratio was 23:1:0. The intrinsic viscosity of the polymer was .151 dl./g. The polymer was a liquid.

EXAMPLE 63

It is possible to prepare the Group VIII metal complex in situ. Thus dicobalt octacarbonyl, about 0.3 gram; 0.3 gram of triphenylphosphite, and 0.3 ml. of BF₃ diethylether complex were each dissolved in 5 grams of benzene. The cobalt octa carbonyl solution was combined with the triphenylphosphite in the open reatctor, for 10 minutes, followed by the addition of the BF₃ etherate. Benzene, the solvent, was added in an additional amount of 21 grams. The contents were agitated and the temperature raised to 100°. After the polymerization, which was conducted for 6 hours, remaining butadiene was vented to the atmosphere and an antioxidant was charged to the autoclave and blended well with the polymer. The polymer contained a trans:vinyl:cis ratio of 8:1:1.

The Hallcomid complexes of Examples 15, 16, 17 and 19,

do not speed the reaction but in fact lower the rate of reaction to some extent, and can be used to perform this function if desired. A more specific benefit is that the resulting polymers in warm benzene solution, when agitated with water, form a stable emulsion. These Hallcomid complexes are prepared by the following process:

If, for example, a 1:1 molar complex metal salt to Hallcomid is desired, then to one liter flask is charged one mole each of the Hallcomid and the salt (anhydrous or hydrated) with about 400 ml. benzene. The flask is fitted with a thermometer, magnetic stirrer, heating mantle, and Dean-Stark trap plus reflux condenser. With stirring the contents are heated to reflux until no more water is obtained in the trap. Then the Dean-Stark trap is replaced by a vacuum take-off and the benzene removed by the use of vacuum. The complex should be fluid. When using other catalysts and complexes according to the invention, the polymer may be emulsified in water by known methods, if a latex is desired.

EXAMPLE 64

When other group VIII metal coordination complexes together with compounds of trivalent group V–A elements, at least one mole of the group V–A compound being complexed with each group VIII atom, and with or without carbon monoxide molecules, the number of carbon monoxide molecules being less than the coordination valences of the central metal atom, are used in the polymerization reaction in place of the nickel and cobalt complexes, similar results are achieved. Thus, if equal molar proportions of an inorganic Lewis acid such as ZnCl₂ or BF₃ and of tetrakis(triphenylphosphine) platito 10% catalyst, linear unsaturated polymers are obtained having, for instance, 50 to 100% trans-unsaturation, 0–45% vinyl-unsaturation, and 0–40% cis-unsaturation.

While the tetrahydrofuran has been called a solvent in the above examples, it may also be referred to as a catalyst component or catalyst activator in view of its beneficial effect upon the rate and course of the reaction.

We claim:

1. A process of polymerizing a polymerizable ethylenically unsaturated organic compound to produce solid and fluid polymers which comprises contacting said organic compound with at least about 0.01% based on the weight of said organic compound, of a catalyst consisting essentially of the components:
   (i) a coordination complex of a metal in the zero-valent state with a compound of a trivalent Group V–A element, said complex having the empirical formula $(L)_x M(CO)_{v-x}$ in which M is a metal selected from Ni, Pd, Pt, Co, Fe, Cr, Ru, Rh, Os, and Ir in the zero-valent state, $v$ corresponds to the number of coordination bonds of the metal M, $x$ is from 1 to a number equal to $v$, and L is a compound of a trivalent group V–A element of the formula $(RQ_a)_3Z$ in which R is an organic radical, Q is sulfur or oxygen, A is zero or 1, and Z is a group V–A element selected from N, P, As, Sb, and Bi, and
   (ii) an inorganic Lewis acid selected from the group consisting of an aluminum halide, an aluminum oxyhalide, an arsenic halide, an arsenic oxyhalide, an antimony halide, an antimony oxyhalide, a beryllium halide, a beryllium oxyhalide, a bismuth halide, a bismuth oxyhalide, a boron halide, a cadmium halide, a cadmium oxyhalide, a magnesium halide, a magnesium oxyhalide, a phosphorous halide, a phosphorous oxyhalide, a tin halide, a tin oxyhalide, a tellurium halide, a tellurium oxyhalide, a zinc halide, and a zinc oxyhalide.

2. The process of claim 1, wherein the inorganic Lewis acid is an aluminum halide.

3. The process of claim 1, wherein the inorganic Lewis acid is a zinc halide.

4. The process of claim 1, wherein the inorganic Lewis acid is a boron halide.

5. The process of claim 1, wherein the zero valent metal is nickel, and the compound of the Group V–A element is selected from the group consisting of organophosphines, organophosphites, organoarsines, organoarsenites, organoantimonites, and organostibines.

6. A process of polymerizing an open chain olefin containing conjugated unsaturation to produce solid and fluid polymers which comprises
   (1) contacting said olefin with a catalyst in an amount of at least about 0.01% based on the weight of said olefin, said catalyst consisting essentially of the components;
      (i) a coordination complex of zero-valent nickel and a compound of a trivalent Group V–A element, said complex having the empirical formula $(L)_x Ni(CO)_{4-x}$, wherein $x$ is a whole number in the range of 1 to 4, and L is a compound of a trivalent group V–A element selected from the group consisting of organophosphines, organophosphites, organoarsines, organoarsenites, organostibines, and organoantimonites; and (ii) an inorganic Lewis acid selected from the group consisting of an aluminum halide, an aluminum oxyhalide, an arsenic halide, an arsenic oxyhalide, an antimony halide, an antimony oxyhalide, a beryllium halide, a beryllium oxyhalide, a bismuth halide, a bismuth oxyhalide, a boron halide, a cadmium halide, a cadmium oxyhalide, a magnesium halide, a magnesium oxyhalide, a phosphorous halide, a phosphorous oxyhalide, a tin halide, a tin oxyhalide, a tellurium halide, a tellurium oxyhalide, a zinc halide, and a zinc oxyhalide; and (2) recovering a polymer which contains approximately 60% to 90% trans unsaturation, 9% to 10% vinyl unsaturation, and 5% to 40% cis unsaturation.

7. The process of claim 6, wherein the open chain olefin is butadiene.

8. The process of claim 6, wherein the inorganic Lewis acid is an aluminum chloride.

9. The process of claim 6, wherein the inorganic Lewis acid is a zinc chloride.

10. The process of claim 6, wherein the inorganic Lewis acid is a boron trifluoride.

11. The process of claim 6, wherein the coordination complex of zero-valent nickel corresponds to the formula $(L)_4Ni$.

12. The process of claim 6, wherein the coordination complex of zero-valent nickel corresponds to the formula $(L)_3NiCO$.

13. The process of claim 6, wherein the coordination complex of zero-valent nickel corresponds to the formula $(L)_2Ni(CO)_2$.

14. A catalyst composition consisting essentially of the components (i) a coordination complex of a zero-valent metal with a compound of a trivalent Group V-A element, said complex having the empirical formula $(L)_xM(CO)_{v-x}$ in which M is a metal selected from Ni, Pd, Pt, Co, Fe, Cr, Ru, Rh, Os and Ir in the zero-valent state, $v$ corresponds to the number of coordination bonds of the metal M, $x$ is a whole number in the range of 1 to a number equal to $v$, and L is a compound of a trivalent group V-A element of the formula $(RQ_a)_3Z$ in which R is an organic radical, Q is sulfur or oxygen, $a$ is zero or 1, and Z is a group V-A element selected from N, P, As, Sb and Bi, and (ii) an inorganic Lewis acid selected from the group consisting of an aluminum halide, an aluminium oxyhalide, an arsenic halide, an arsenic oxyhalide, an antimony halide, an antimony oxyhalide, a beryllium halide, a beryllium oxyhalide, a bismuth halide, a bismuth oxyhalide, a boron halide, a cadmium halide, a cadmium oxyhalide, a magnesium halide, a magnesium oxyhalide, a tellurium halide, a tellurium oxyhalide, a zinc halide and a zinc oxyhalide.

15. The catalyst composition of claim 14, wherein the inorganic Lewis acid is zinc chloride.

16. The catalyst composition of claim 14, wherein the inorganic Lewis acid is an aluminum chloride.

17. The catalyst composition of claim 14, wherein the inorganic Lewis acid is boron trifluoride.

18. The catalyst composition of claim 14, wherein the zero-valent metal is nickel, and the group V-A element is phosphorous.

19. The catalyst composition of claim 14, wherein the zero-valent metal is cobalt and the group V-A element is phosphorous.

20. A catalyst composition consisting essentially of the components (i) a coordination complex of zero-valent nickel with a compound of a trivalent Group V-A element, said complex having the empirical formula $$(L)_xNi(CO)_{4-x}$$

wherein $x$ is a whole number in the range of 1 to 4, and L is a compound of a trivalent group V-A element selected from the group consisting of organophosphines, organophosphites, organoarsines, organoarsenites, organostibines, and organoantimonites; and (ii) an inorganic Lewis acid selected from the group consisting of an aluminum halide, a zinc halide, and a boron halide.

21. The catalyst composition of claim 20, wherein the coordination complex of zero-valent nickel corresponds to the formula $(L)_4Ni$.

22. The catalyst composition of claim 20, wherein the coordination complex of zero-valent nickel corresponds to the formula $(L)_3NiCO$.

23. The catalyst composition of claim 20, wherein the coordination complex of zero-valent nickel corresponds to the formula $(L)_2Ni(CO)_2$.

References Cited

UNITED STATES PATENTS

| | | | |
|---|---|---|---|
| 3,066,125 | 11/1962 | Porter et al. | 260—94.3 |
| 3,255,170 | 6/1966 | Childers | 260—94.3 |
| 3,414,555 | 12/1968 | Jenkins et al. | 260—94.3 |

JOSEPH L. SCHOFER, Primary Examiner

R. A. GAITHER, Assistant Examiner

U.S. Cl. X.R.

252—429, 431; 260—82.1, 84.1, 85.3, 92.3, 92.8, 93.5, 93.7, 94.8, 94.9, 439, 666